United States Patent
Murphy et al.

(12) 
(10) Patent No.: US 6,419,398 B1
(45) Date of Patent: Jul. 16, 2002

(54) DOUBLE WALL BEARING CUP

(75) Inventors: Richard F. Murphy, Torrington; Michael D. Myers, Watertown; William A. Gordon, Winsted, all of CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/126,290

(22) Filed: Jul. 30, 1998

(51) Int. Cl.⁷ .............................................. F16C 33/58
(52) U.S. Cl. ...................... 384/569; 384/905.1; 384/912
(58) Field of Search .............................. 384/905.1, 569, 384/565, 564, 513, 912

(56) References Cited

U.S. PATENT DOCUMENTS

| | | |
|---|---|---|
| 1,159,645 A | 11/1915 | Brown |
| 3,849,868 A | 11/1974 | Jost |
| 4,522,514 A | 6/1985 | Olschewski et al. |
| 4,887,918 A | 12/1989 | Kawachi |
| 5,297,509 A | 3/1994 | Murphy |
| 5,385,413 A | 1/1995 | Murphy et al. |

FOREIGN PATENT DOCUMENTS

| | | |
|---|---|---|
| DE | 29 01 826 | 7/1980 |
| DE | 41 34 604 | 4/1993 |

*Primary Examiner*—Lenard A. Footland
(74) *Attorney, Agent, or Firm*—John C. Bigler

(57) ABSTRACT

A needle bearing cup includes an inner bearing cup having an inner surface which forms a rolling element raceway and an outer bearing cup disposed about the periphery of the inner bearing cup having a length greater than a length of the inner bearing cup to form a lip. The lip of the outer bearing cup is then formed to retain rolling elements within the inner bearing cup. Preferably, the rolling elements are needle rollers and the inner bearing cup is secured to an outer bearing cup by mechanical lock in the form of a protruding portion extending from the outer bearing cup. The bearing cup may be double drawn with first and second sheet metal blanks forming the inner and outer bearing cups. The lip of the outer bearing cup may be formed through ductile expansion using a punch having an inner diameter portion joined to an outer diameter portion with a step that contacts a top portion of the continuous sidewall portion of the inner bearing cup such that the lip extends about the outer diameter portion of the punch.

13 Claims, 4 Drawing Sheets

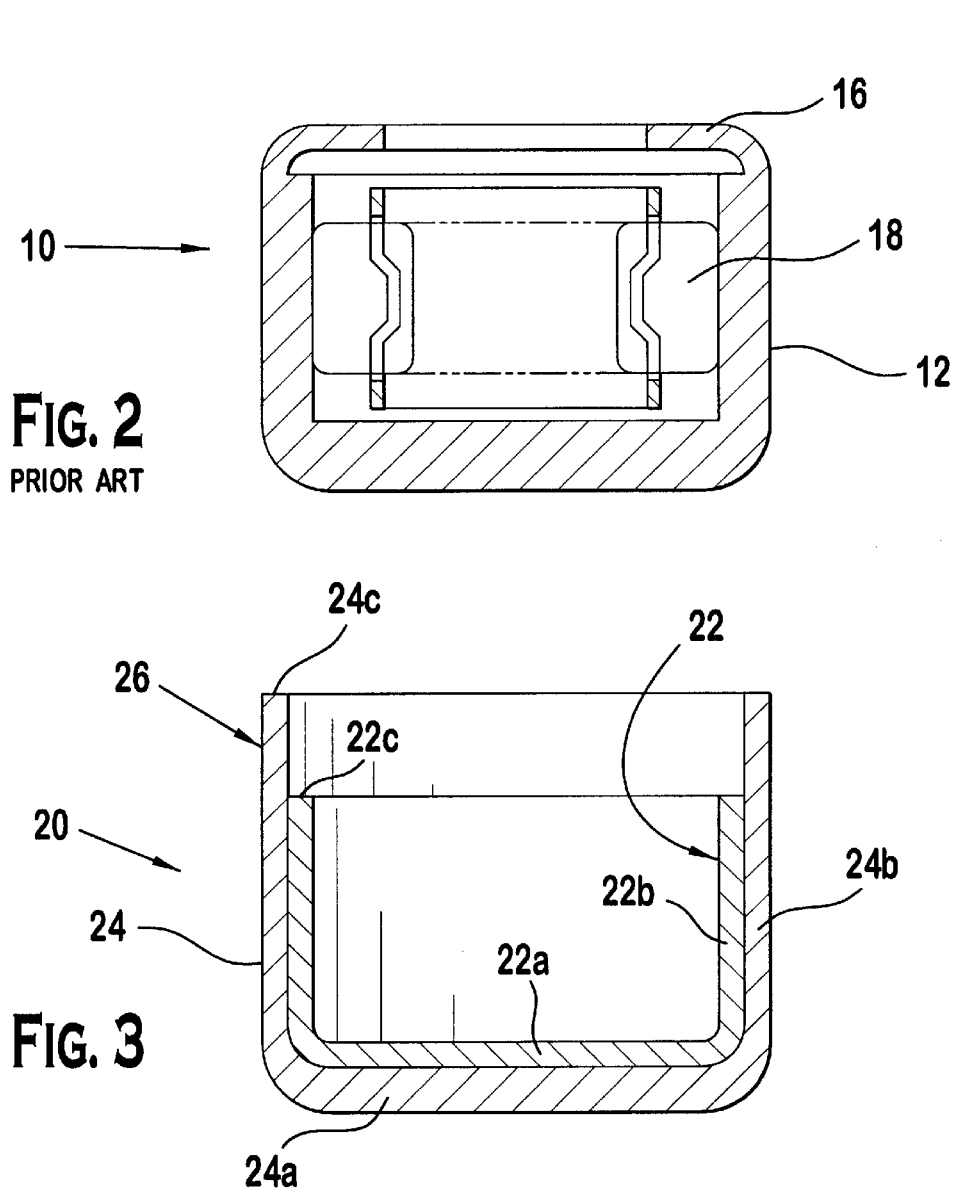

DOUBLE WALL BEARING CUP

BACKGROUND OF THE INVENTION

The invention relates generally to needle bearing cups, and more particularly to double drawn needle bearing cups having a shell formed from an outer cup and an inner cup.

FIG. 1 (PRIOR ART) is a cross sectional view of a conventional drawn needle bearing cup. Conventional needle bearing cup 10 includes a cylindrical shell 12 which is drawn from a piece of flat stock. Inner surface 14 of needle bearing cup 10 forms a bearing raceway for a plurality of rolling elements (not shown). The top portion of needle bearing cup 10 has a thinner cross section and is conventionally referred to as a lip 16. Needle bearing cup 10 houses a number of internal components such as the aforementioned rolling elements. Additional internal components may include a retainer cage to hold and guide the rolling elements, one or more seals, and less commonly, washers or rings for more specialized purposes.

FIG. 2 (PRIOR ART) illustrates conventional needle bearing cup 10 having a number of internal components 18 installed within cylindrical shell 12. Lip 16 is then bent over during final assembly to retain the internal components. In order for lip 16 to be formed and maintain the required ductility during final assembly, lip 16 is not heat treated to the same extent as required for bearing raceway surface 14. Thus, a special heat treat process is required which prevents lip 16 from being fully hardened when bearing cup 10 is heat treated. In the alternative, an additional temper or anneal process is required to soften lip 16 prior to forming in the bent over position during final assembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing cup including an inner bearing cup having an inner surface which forms a bearing raceway. The inner bearing cup has a corresponding length. An outer bearing cup is disposed about and continuous with the periphery of the inner bearing cup and has a corresponding length which is longer than the length of the inner bearing cup to form a lip. The lip of the outer bearing cup may be formed to retain rolling elements within the bearing cup.

In another aspect of the invention, the limitations of the prior art are overcome by providing a method of forming a bearing cup having an inner bearing cup and an outer bearing cup. The method includes cutting first and second sheet metal sections into first and second sheet metal blanks. The first and second sheet metal blanks are then drawn to form a double walled bearing cup including an inner bearing cup corresponding to the first sheet metal blank and an outer bearing cup corresponding to the second sheet metal blank. A lip is formed from the outer bearing cup and extends beyond a top portion of the inner bearing cup. Roller elements are then installed within the inner bearing cup and the lip is bent over to retain the rolling elements within the inner bearing cup.

The foregoing and other aspects will become apparent from the following detailed description of the invention when considered in conjunction with the accompanying drawing figures.

BRIEF DESCRIPTION OF THE DRAWING FIGURES

FIG. 1 (PRIOR ART) is a cross sectional view of a conventional drawn needle bearing cup;

FIG. 2 (PRIOR ART) is a cross sectional view of a conventional needle bearing cup having a lip bent over during final assembly to retain internal components;

Figure 4:
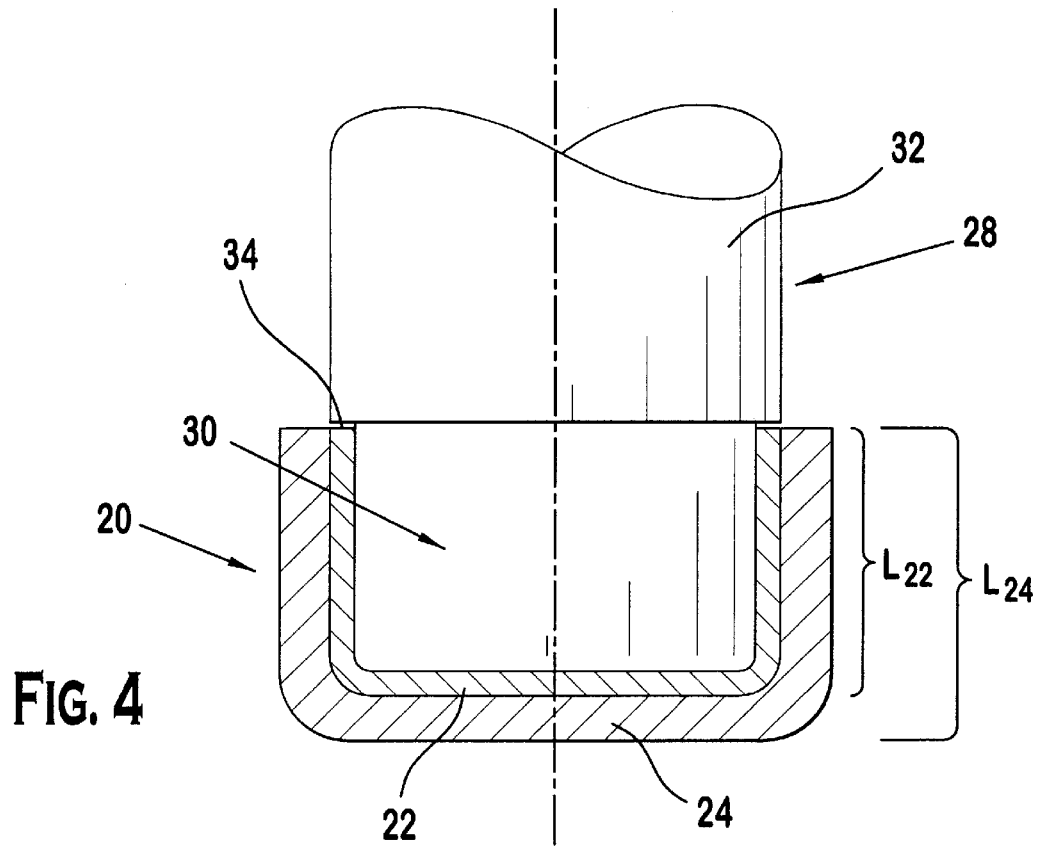
Figure 5:
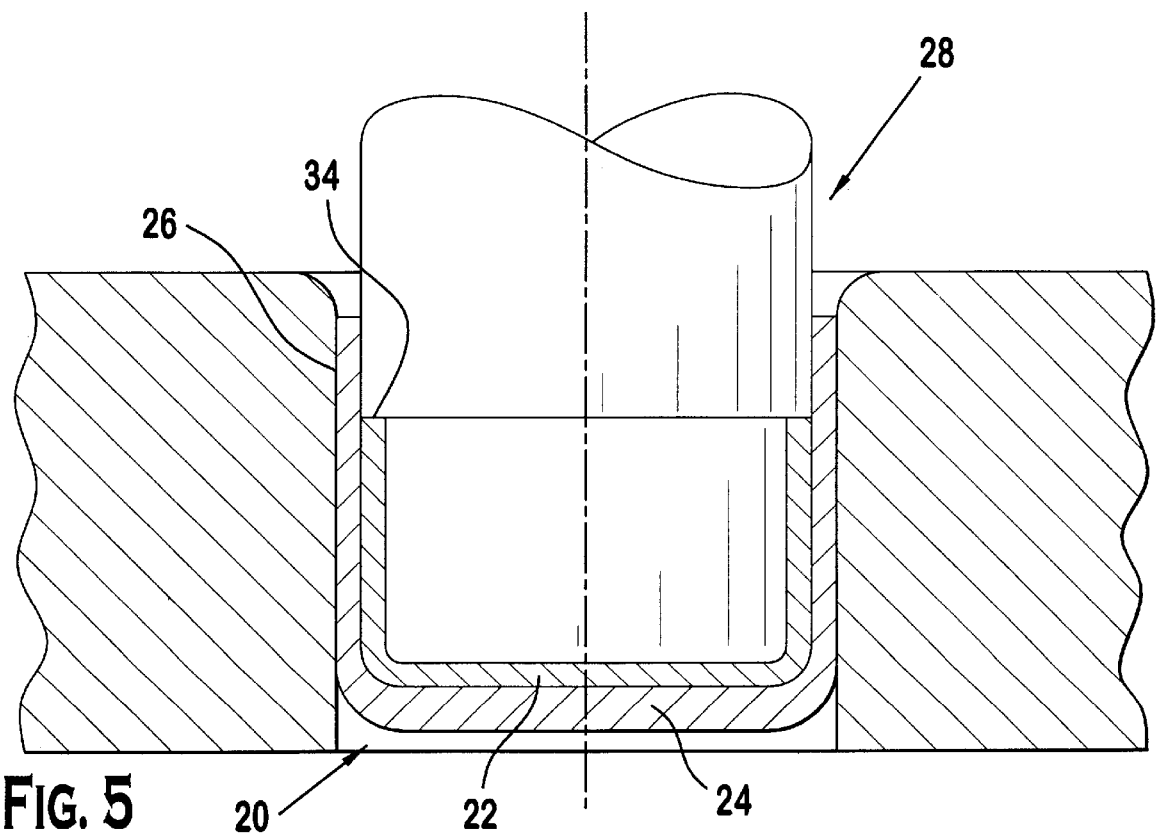
Figure 6A:
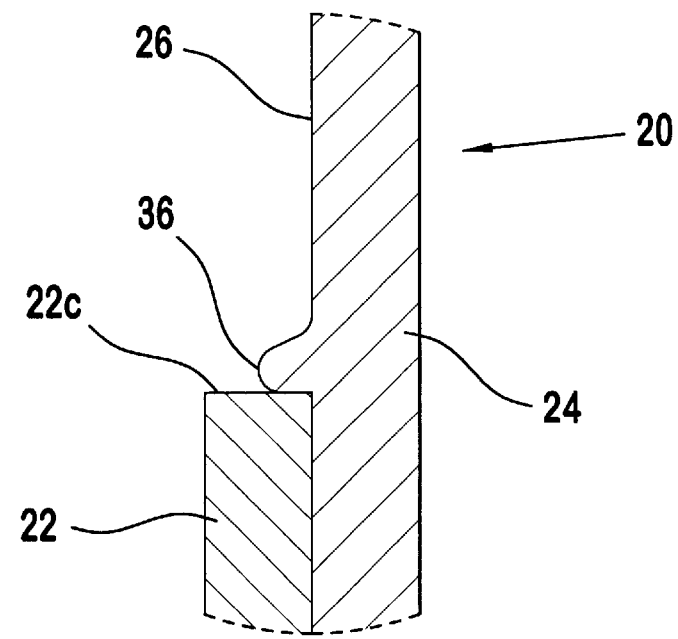
Figure 6:
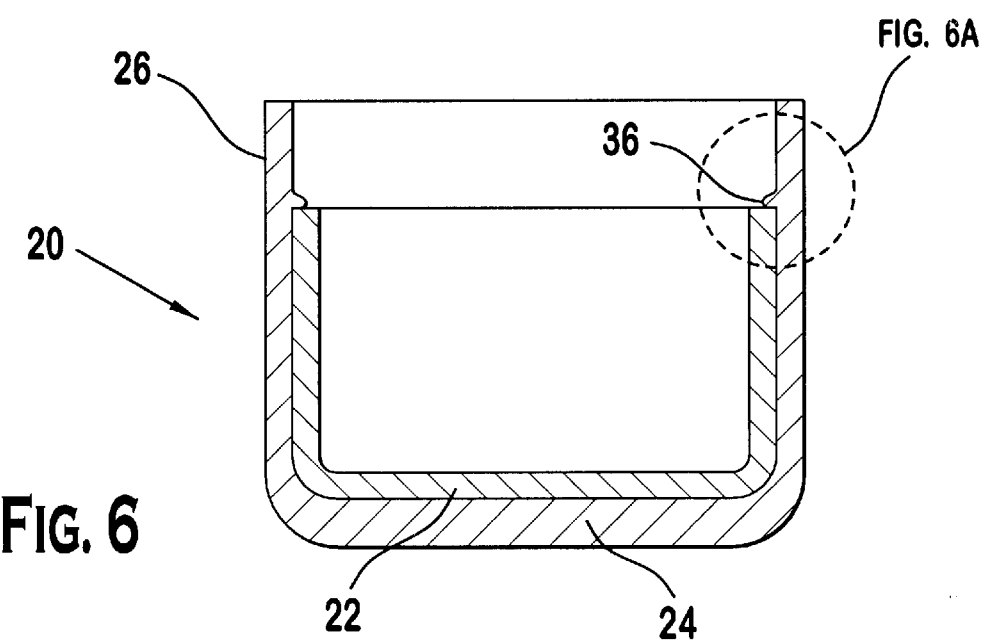
Figure 7:
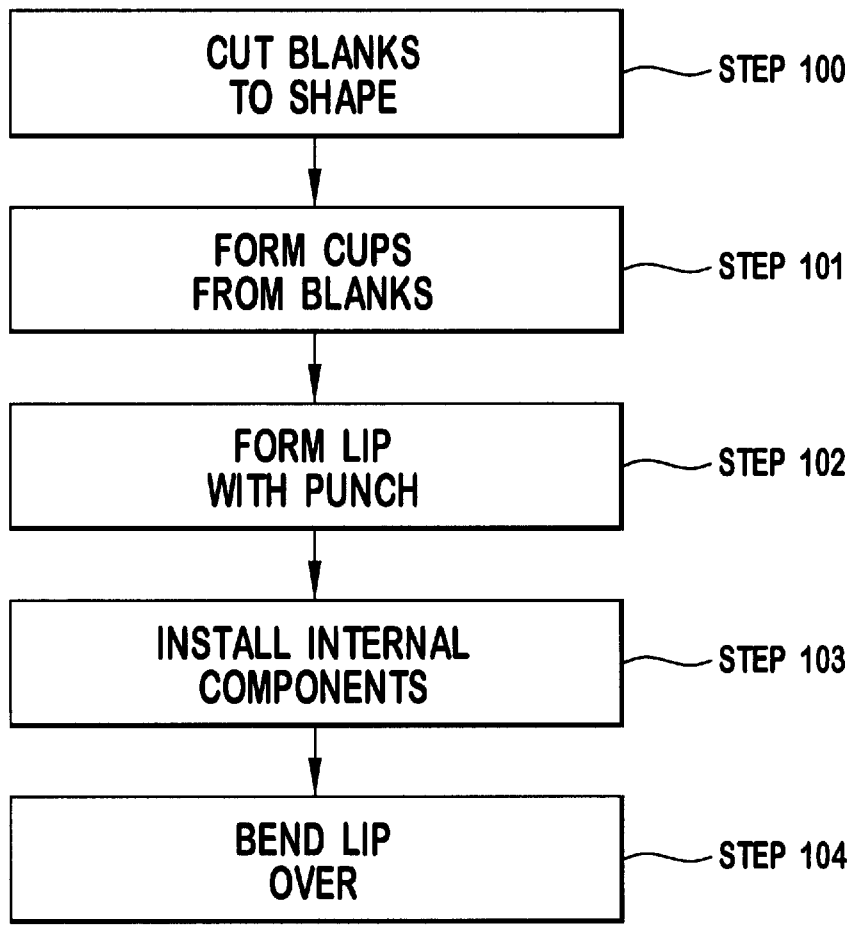

FIG. 3 a sectional view of a partially finished needle bearing cup formed from an inner bearing cup and an outer bearing cup according to an embodiment of the present invention;

FIG. 4 is a sectional view of a partially finished needle bearing cup positioned over a punch having a smaller diameter portion and a larger diameter portion according to an embodiment of the present invention;

FIG. 5 is a sectional view of a punch preventing an inner bearing cup from becoming elongated while an outer bearing cup is extended according to an embodiment of the present invention;

FIGS. 6 and 6A are sectional views of a needle bearing cup including a protruding portion according to an embodiment of the present invention; and FIG. 7 is a flow chart of the formation of a double drawn needle bearing cup according to an embodiment of the present invention.

DETAILED DESCRIPTION

Referring now to the drawings, FIG. 3 illustrates a sectional view of a bearing cup 20 including an inner bearing cup 22 that may be formed within an outer bearing cup 24. Outer bearing cup 24 has a lip 26 which extends beyond an upper wall of inner bearing cup 22. Preferably, outer bearing cup 24 is made from a material that remains relatively soft during a heat treat process which is required to harden inner bearing cup 22. Examples of materials that could be used include a high carbon steel for inner bearing cup 22 and a low carbon steel for outer bearing cup 24.

According to an embodiment of the present invention, inner bearing cup 22 and outer bearing cup 24 are formed simultaneously using a deep drawing process. The deep drawing process is a double drawn process such that inner bearing cup 22 and outer bearing cup 24 are simultaneously formed from overlapping blanks of sheet metal. However, according to another embodiment of the present invention, needle bearing cup 20 may be manufactured by separately forming inner bearing cup 22 from a first sheet metal blank and outer bearing cup 24 from a second sheet metal blank.

The advantages of separate material for inner bearing cup 22 and outer bearing cup 24 become apparent from the manufacturing process used to form needle bearing cup 20. A typical drawn cup manufacturing process is performed in several steps, normally referred to as stations. The overall thickness of the material being drawn is directly related to the number of stations required to form the bearing cup. A substantially thicker material requires additional stations to form a bearing cup than does a thinner material. A bearing cup including two cup layers may be formed more readily than a bearing cup having a single cup layer of equal thickness. When two thinner bearing cups are double drawn together, the two bearing cups act as though they are being formed independently of the other and therefore can be made using fewer stations than would be required for a bearing cup having a single cup layer.

As illustrated in FIG. 3, inner bearing cup 22 includes a bottom portion 22a and a continuous sidewall portion 22b extending upwardly therefrom. Likewise, outer bearing cup 24 includes a bottom portion 24a and a continuous sidewall portion 24b extending upwardly therefrom. Sidewall portion 22b forms the bearing raceway and is generally circular. As illustrated in FIG. 3, top portion 22c of inner bearing cup 22 is substantially lower than top portion 24c of outer bearing cup 24 to expose lip 26.

A further advantage of drawing an inner cup and an outer cup together is that lip 26 is formed from material of outer cup 26. During at least one of the stations required to form a drawn bearing cup, the wall section is thinned, or "ironed" into a final size. The ironing station is provided with a cylindrical die cooperating with a punch which forms the inside of the cup.

During the ironing process, the volume of material removed from inner cup 22 or outer cup 24 is used to increase the length of the respective cup. According to an embodiment of the present invention, a punch used in the ironing process has two diameters, namely a smaller lower diameter which forms a rolling element raceway area, and a larger upper diameter which forms lip 26. The point where the smaller diameter meets the larger diameter forms a step.

FIGS. 4 and 5 are sectional views of needle bearing cup 20 positioned over a punch 28 having a smaller diameter portion 30 and a larger diameter portion 32 according to an embodiment of the present invention. Punch 28 has a step 34 which is formed at a point where smaller diameter portion 30 meets larger diameter portion 32. Prior to the ironing step effected by punch 28, inner bearing cup 22 is preferably formed of a predetermined length $L_{22}$ and outer bearing cup 24 is preferably formed of a predetermined length $L_{24}$. The length $L_{22}$ and length $L_{24}$ are formed such that top portion 22c of inner bearing cup 22 is substantially the same as top portion 24c of outer bearing cup 24, and respectively correspond to the lengths of sidewall portion 22b and sidewall portion 24b.

With the proper selection of initial material thickness, needle bearing cup 20 is formed in one or more of the stations prior to the ironing station such that the length of inner cup 22 is the same or slightly shorter than a required length of the raceway in the final form. The step 34 in punch 28 is therefore the same or slightly longer than the length of the cup coming into the ironing station.

As illustrated in FIG. 5, when cup 20 is ironed, the step 34 in punch 28 prevents inner cup 22 from becoming further elongated. Therefore, most of the excess volume of material from the ironing operation is produced from ductile extension of outer cup 24, which thereby forms lip 26. The amount of ironing shown in FIG. 4 and FIG. 5 is exaggerated for clarity.

The process of forming lip 26 using material from outer cup 24 can be aided by selecting material for inner cup 22 which is significantly stronger, i.e. having a higher yield strength, than the material for outer cup 24. An example of materials which provide a significant difference in strength for inner cup 22 and outer cup 24 is high and low carbon steel. Typical low carbon steels in a condition for drawing operations have yield strengths in the range of 40,000 psi. High carbon steels conditioned for drawing operations have yield strengths in the range of 60,000 psi. Since the outer material is weaker, the outer material will plastically yield first. Moreover, the majority of ironing occurs in the outer material, and thus the material used to form lip 26 comes from the outer material.

The above process of forming lip 26 also results in the length of inner cup 22 not growing significantly during the ironing operation since its wall is not being thinned. If the material for outer cup 24 is significantly ductile over and above inner cup 22, the length of inner cup 22 will not significantly increase even if the step 34 of punch 28 does not directly contact the top of inner cup 22. In this case, the distance from step 34 of punch 28 to inner cup 22 may be sufficiently long such that in the ironing station, material from outer cup 24 forms a protruding section above the end of inner cup 22.

FIGS. 6 and 6A are sectional views illustrating needle bearing cup 20 in which a protruding portion 36 from outer cup 24 extends above top portion 22c of inner cup 22 according to an embodiment of the present invention. Protruding portion 36 provides a mechanical lock with inner cup 22 which aids in physically holding the two cups together during further processing and use.

The double wall cup design also allows the use of two entirely different materials to create a bi-metallic structure. Typical drawn cup needle bearings are retained in their applications by a housing material with an interference fit. Problems can occur when the housing material has an higher coefficient of thermal expansion than the cup material. In this case, as operating temperatures elevate, the differential growth between the cup material and the housing material can result in a loss of interference fit. Furthermore, it is common for the housing material to be of insufficient strength to act as the raceway surface. A typical example would be a ferrous cup material used in an aluminum housing.

Thus, a bi-metallic structure according to the present invention has an advantage in that a double wall cup may be formed with a thinner inner cup made from material suitable for application as a raceway and an outer cup made from a material which expands at elevated temperatures in close relation to the housing material. According to this embodiment of the present invention, at elevated temperatures, the interference fit between the outer cup and the housing is maintained. Additional advantages may be obtained by using a stainless steel material for the outer cup to prevent the exposed area of the cup from corrosion.

FIG. 7 is a flow chart illustrating a method of forming a double drawn needle bearing cup according to an embodiment of the present invention. As set forth in step 100, first and second sections of sheet metal are cut into shaped blanks. According to a preferred embodiment of the present invention, the first and second sheet metal blanks have identical shapes and are simultaneously formed. To form drawn needle cup bearings, the first and second sheet metal blanks are preferably in a form having an arcuate outer perimeter. More preferably, the first and second sheet metal blanks have a circular outer perimeter.

In step 101, the first and second blanks are formed into a double walled cup including inner cup 22 corresponding to the first blank and outer cup 24 corresponding to the second blank. Step 101 may take several stations to form the double walled cup. Inner bearing cup 22 and outer bearing cup 24 are preferably in a form illustrated in FIG. 4. In step 101, the length of inner bearing cup 22 and the length of outer bearing cup 24 are preferably set to predetermined amounts. Preferably, the length of inner bearing cup 22 is substantially equal to the length of outer bearing cup 24.

In step 102, the bearing cups are formed with punch 28 having the step 34. The step 34 of punch 28 contacts the top 22c of inner bearing cup 22 to prevent further elongation. The inner surface of inner bearing cup 22 will become the rolling element raceway. On the other hand, step 34 of punch 28 does not contact top portion 24c of outer bearing cup 24, such that lip 26 is formed through ductile extension.

In step 103, internal components such as rolling elements are installed within the inner bearing cup 22. According to an embodiment of the present invention, the rolling elements are needle rollers. The internal components may also include a retainer cage to hold and guide the rolling elements, or one or more washers or rings for more specialized purposes. In step 104, the lip 26 is bent over to retain the internal components and complete the forming of needle bearing cup 20.

What is claimed is:

1. A bearing cup comprising:

an inner bearing cup having an inner surface which forms a rolling element raceway, said inner bearing cup having a corresponding length; and an outer bearing cup disposed about and continuous with the periphery of said inner bearing cup, said outer bearing cup having a corresponding length which is longer than the length of said inner bearing cup to form a lip, whereby the lip of said outer bearing cup may be formed to retain rolling elements within the bearing cup;

said outer bearing cup being formed of a material that is more ductile than material forming said inner bearing cup.

2. The bearing cup according to claim 1, wherein the bearing cup is a needle bearing cup and the rolling elements are needle rollers.

3. The bearing cup according to claim 1, wherein said outer bearing cup has a protruding portion which provides a mechanical lock with a top portion of said inner bearing cup.

4. The bearing cup according to claim 3, wherein the protruding portion protrudes over a part of the top portion of said inner bearing cup.

5. The bearing cup according to claim 1, wherein said inner bearing cup is formed from a first metal and said outer bearing cup is formed from a second metal different from said first metal such that the bearing cup is bi-metallic.

6. The bearing cup according to claim 1, wherein each of said inner bearing cup and said outer bearing cup comprises:

a bottom portion; and a continuous sidewall portion extending from said bottom portion, the lip of said outer bearing cup being formed through ductile extension of the outer bearing cup about a punch.

7. The bearing cup according to claim 6, said punch having an inner diameter portion joined to an outer diameter portion with a step, wherein during formation of the lip, the inner diameter portion of the punch is received within the continuous sidewall portion of said inner bearing cup and the step contacts a top portion of the continuous sidewall portion of said inner bearing cup such that the lip extends about the outer diameter portion of the punch.

8. The bearing cup according to claim 1, wherein said inner bearing cup and said outer bearing cup are double drawn.

9. A bearing cup comprising:

an inner bearing cup having an inner surface which forms a rolling element raceway, said inner bearing cup having a corresponding length; and an outer bearing cup disposed about and continuous with the periphery of said inner bearing cup, said outer bearing cup having a corresponding length which is longer than the length of said inner bearing cup to form a lip, whereby the lip of said outer bearing cup may be formed to retain rolling elements within the bearing cup;

said inner bearing cup being formed of a high carbon steel and said outer bearing cup being formed of a lower carbon steel.

10. A bearing cup comprising:

an inner bearing cup having an inner surface which forms a rolling element raceway, said inner bearing cup having a corresponding length; and an outer bearing cup disposed about and continuous with the periphery of said inner bearing cup, said outer bearing cup having a corresponding length which is longer than the length of said inner bearing cup to form a lip, whereby the lip of said outer bearing cup may be formed to retain rolling elements within the bearing cup;

said outer bearing cup being formed of stainless steel.

11. A bearing cup comprising:

an inner bearing cup having an inner surface which forms a rolling element raceway, said inner bearing cup having a corresponding length; and an outer bearing cup disposed about and continuous with the periphery of said inner bearing cup, said outer bearing cup having a corresponding length which is longer than the length of said inner bearing cup to form a lip, whereby the lip of said outer bearing cup may be formed to retain rolling elements within the bearing cup;

wherein each of said inner bearing cup and said outer bearing cup comprises a bottom portion and a continuous sidewall portion extending from said bottom portion, the sidewall portion of said inner bearing cup being thinner than the sidewall portion of said outer bearing cup.

12. A needle bearing cup having an inner bearing cup and an outer bearing cup, formed from a process comprising the steps of:

cutting first and second sheet metal sections into first and second sheet metal blanks, the first sheet metal section having a lower ductility than the second sheet metal section;

double drawing the first and second sheet metal blanks to form a double walled bearing cup including an inner bearing cup corresponding to the first sheet metal blank and a outer bearing cup corresponding to the second sheet metal blank;

forming a lip from the outer bearing cup which extends beyond a top portion of the inner bearing cup;

installing rolling elements within the inner bearing cup; and bending the lip to retain the inner rolling elements within the inner bearing cup.

13. The needle bearing cup according to claim 12, wherein in said forming step, a protruding portion is formed from the outer bearing cup over the top portion of the inner bearing cup to provide a mechanical lock between the inner bearing cup and the outer bearing cup.

* * * * *